Figure 1:
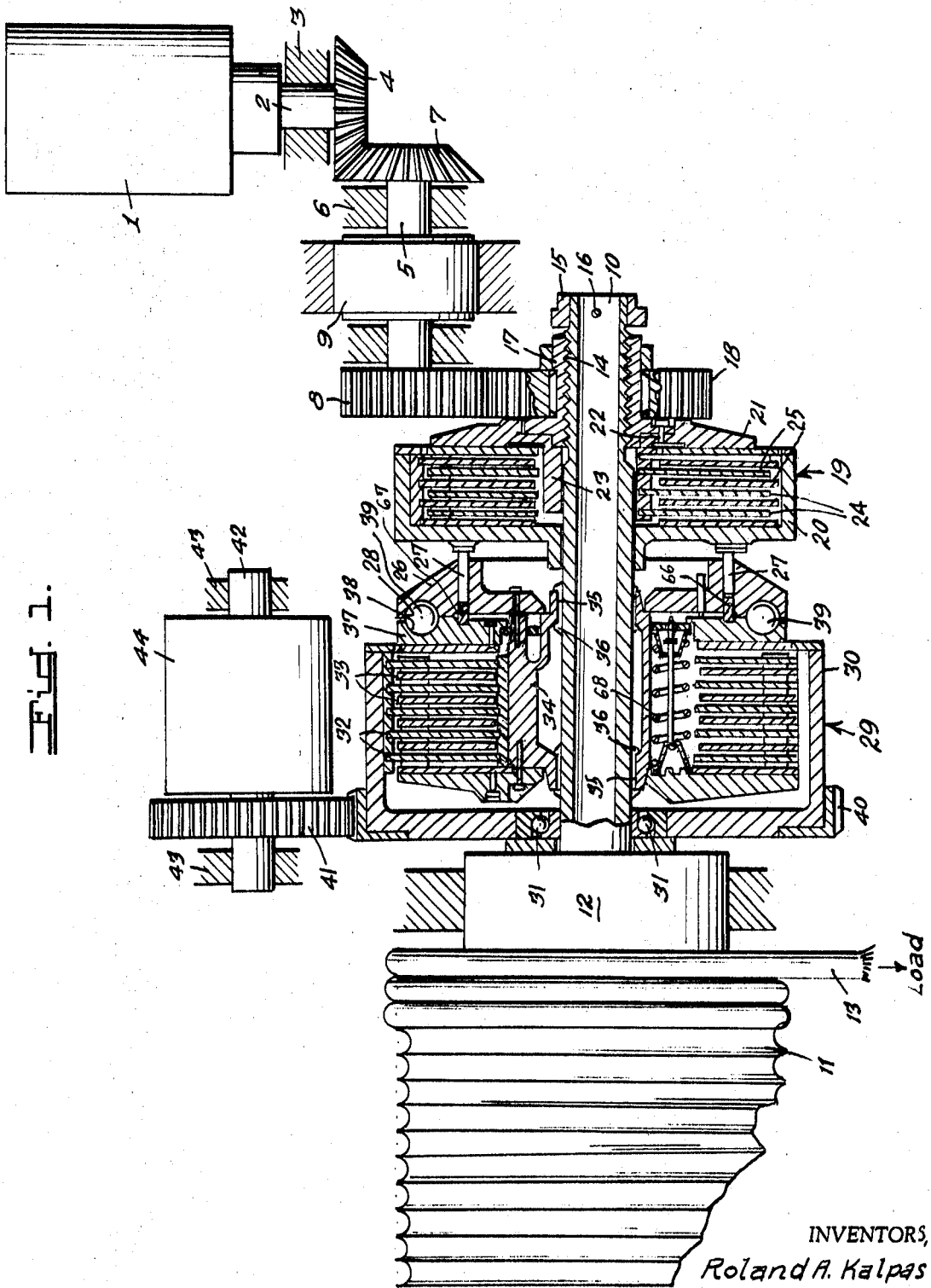

United States Patent

[11] 3,572,482

| [72] | Inventors | Roland A. Kalpas<br>Willingboro, N.J.;<br>Derek W. Stowe, Springfield, Pa. |
|---|---|---|
| [21] | Appl. No. | 788,860 |
| [22] | Filed | Jan. 3, 1969 |
| [45] | Patented | Mar. 30, 1971 |
| [73] | Assignee | The United States of America as represented by the Secretary of the Army |

[54] AUTOMATIC CLUTCH AND BRAKE FOR HOISTS
2 Claims, 2 Drawing Figs.

[52] U.S. Cl. .................................................. 192/15,
192/8, 192/16, 192/12, 192/54, 254/187
[51] Int. Cl. ....................................................F16d 67/02,
F16d 67/00
[50] Field of Search.......................................... 192/15, 16,
12 (B), 18, 54

[56] References Cited
UNITED STATES PATENTS

| 1,841,284 | 1/1932 | Gillett............................ | 192/54X |
| 3,273,681 | 9/1966 | Seifert............................ | 192/54 |
| 1,031,302 | 7/1912 | Tucker........................... | 192/16 |
| 1,957,061 | 5/1934 | Goldberg........................ | 192/15X |
| 2,372,026 | 3/1945 | Smith............................. | 192/8X |
| 2,501,096 | 3/1950 | Robins et al. .................. | 192/15 |
| 972,451 | 10/1910 | Israel.............................. | 192/16X |
| 2,800,985 | 7/1957 | Ronceray....................... | 192/15X |

Primary Examiner—Benjamin W. Wyche
Attorneys—Harry M. Saragovitz, Edward J. Kelly, Herbert Berl and Robert P. Gibson ABSTRACT: A mechanical load brake system having a motor in driving connection with a traveling nut threadable on the drive shaft of a hoist drum. When rotated in one direction the nut will engage an input clutch which, in turn, engages a disc brake to lock a brake housing for rotation with the drive shaft. The brake housing is prevented from rotation in both directions by a backstop brake to permit free rotation of the drive shaft during hoisting without having to overcome brake friction torque in addition to the torque required to hoist the load, and on lowering the load to hold fixed the brake housing to permit generation of a reaction torque when brake application is required. On lowering the speed of the drive shaft is controlled by the nut which acts as a governor.

Patented March 30, 1971 3,572,482

2 Sheets-Sheet 1

INVENTORS,
Roland A. Kalpas
Derek W. Stowe

BY: Harry M. Saragovitz,
Edward J. Kelly &
R. P. Gibson    ATTORNEYS.

INVENTORS,
Roland A. Kalpas
Derek W. Stowe

BY: Harry M. Saragovitz,
Edward J. Kelly &
R. P. Gibson     ATTORNEYS.

AUTOMATIC CLUTCH AND BRAKE FOR HOISTS

A problem in a large lifting capacity winch hoist system has been the brake control mechanisms which does not adequately provide smooth operation.

Present systems do not compensate for drum slippage or backlash which makes jerky and unsafe operation.

The system of this invention is designed to provide improved response and smoother action of the load brake system by the combination of a multidisc-type self-energized brake unit, backstop brake and a traveling nut.

It is therefore a primary object of this invention to provide a fail-safe mechanical load brake system permitting hoisting without increasing hoisting torque above the load torque and instantly arresting reduced drum rotation in lowering direction when torque exceeds the driving torque as in case of input power failure or in case of air gust suddenly lifting the aircraft when air hoist system is considered.

It is another object to permit automatic braking on lowering the load such that the load descent energy is absorbed by the brake and the winch motor supplies input torque in lowering direction.

A further object is to provide a brake system providing a smoother operation and the elimination of backlash.

A final object is to provide automatic descent speed regulation such that winch drum rotary speed is automatically adjusted by the action of the brake to follow the motor input speed.

Figure 2:
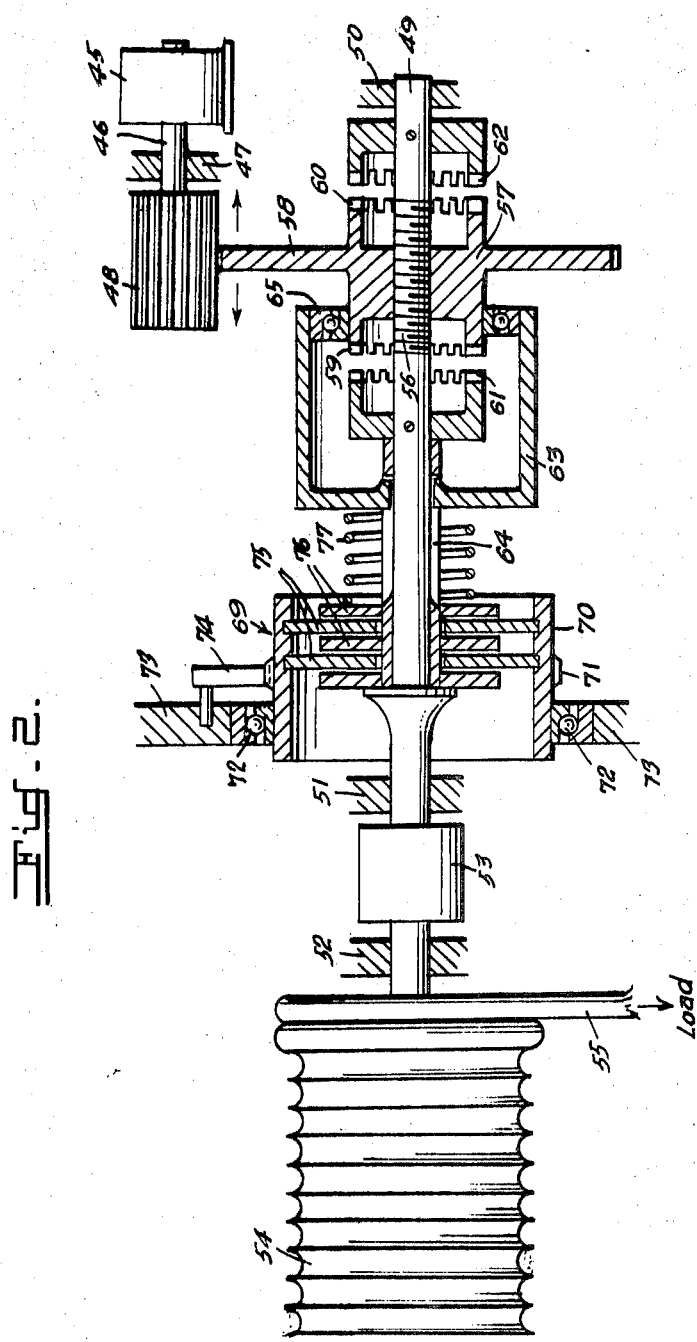

These and other objects and advantages of the present invention will be fully apparent from the following description when taken in connection with the annexed drawing, in which:

FIG. 1 is a longitudinal section view, somewhat schematic, of a mechanical load brake system constructed in accordance with this invention, and, FIG. 2 is a similar view of a modification.

Referring in detail to the drawings wherein like reference numbers denote like parts throughout the views:

FIG. 1 shows a brake system employing a disc clutch between the drive and the disc brake, while FIG. 2 shows a direct drive, spring-type clutch to engage a brake.

In FIG. 1, reference numeral 1 represents a motor, which may be a fluid type and is provided with a drive shaft 2 journaled in bearings 3. A bevel gear 4 is carried by the outer end of shaft 2.

An idler shaft 5 is journaled in bearings 6, its axis being normal to the axis of the motor shaft 2. A bevel gear 7 is carried by the inner end of shaft 5 and meshes with bevel gear 4. A spur gear 8 is carried by the outer end of shaft 5. A reverse locking brake may be mounted on shaft 5, its function to be apparent later.

A drive shaft is indicated by 10 and its axis is parallel to the axis of shaft 5 and spaced therefrom as shown. A winch drum 11 is carried by one end of shaft 10 and a reduction gearbox 12 is shown. Since these are standard items, they have been shown in elevation only. A cable 13 is shown wound about drum 11. Shaft 10 is externally threaded on the other end as at 14. A stop collar 15 is fixed to the threaded end of shaft 10 by a pin 16.

A traveling nut 17 is threadably mounted on threads 14 as shown and a gear 18 is fixed on nut 17 for rotation therewith and is in mesh with gear 8.

An input clutch, generally indicated by 19 is shown and consists of a housing 20 slidable on shaft 10. A collar 21 is fixed to traveling nut 17 by bolts 22 for rotation therewith. Collar 21 is provided with an integral portion 23 which carries friction discs 24 disposed between friction discs 25 carried by housing 20 as shown. A plate 26 is mounted for sliding on a series of pins 27 which are fixed to housing 20 and is provided on its inner face with a ramp 28.

A disc brake assembly is generally indicated by 29 and is disposed between gearbox 12 and plate 26 and is coaxial with clutch 19. The brake assembly consists of a housing 30 journaled for rotation about shaft 10 on bearings 31. A series of friction discs 32 are carried by housing 30 and a series of friction discs 33 are disposed between discs 32 and carried by a hub 34 which is provided with internal splines 35 and which mesh with external splines 36 carried by shaft 10 as shown. A plate 37 is slidable on hub 34 and is provided with a ramp 38 in its outer face which mates with ramp 28 in plate 26. Plate 26 is fixed to hub 34 as shown. A series of balls 39 ride in ramps 28 and 38. Plate 37 has a limited rotary displacement with respect to plate 26 which results in a wedge-type action through balls 39 which increases axial load on the brake 29. Axial loading of brake 29 is further produced by a cylindrical ring 66 which is nested in a groove 67 in plate 26 and pressed by pins 27 protruding from housing 20. The loading action is caused by the nut 17. Compression springs 68 (one being shown) are provided to push up plate 37 when brake releasing is taking place due to up movement of nut 17.

The inner portion of the periphery of housing 30 is provided with external gear teeth 40 and these teeth mesh with a spur gear 41 which is mounted on a shaft 42 journaled in bearings 43 of a backstop brake 44 which may be a sprag-type brake or the like which will permit rotation of housing 30 in only one direction.

When a load is to be hoisted by the winch drum 11, fluid power from a source, not shown, will cause the motor shaft 2 to rotate in the hoisting direction. This rotary motion is transmitted through bevel gears 4 and 7, through reverse locking brake 9, and gear 8 and, in turn, rotates gear 18 which is keyed on traveling nut 17. Until drive shaft 10 is rotated, sufficient torque in the input clutch 19 must be built up. As the traveling nut rotates with gear 18 it moves axially towards input clutch 19 to move collar 21 to move tubular extension 23 carrying discs 24 to contact discs 25 and cause shaft 10 to rotate via housing 20, pins 27, plate 26 and hub 34. Housing 20 also rotates and pins 27 move plate 26 against balls 39 which ride up on ramps 28 and 38 to press plate 37 which carries hub 34 with discs 33 to contact discs 32 carried by housing 30. Now housing 30, which is rotatable about shaft 10 and through splines 35 and 36 shaft 10 will rotate also. Housing 30 is provided with gear teeth 40 and meshes with gear 41 to couple it with backstop brake 44 to prevent reverse movement in the lowering direction. Shaft 10 connected to reduction gearbox 12 by reduction gearing, not shown, rotates winch drum 11 to hoist the load.

The fact that brake 29 is applied, does not interfere with the hoisting movement since the backstop brake 44 geared to housing 30 permits the brake assembly 29 to rotate freely in the hoisting direction, but prevents any reverse movement of housing 30, hence load slippage is prevented. When the motor ceases to rotate, such as when it is desired to stop drum 11 and hold the load, brake housing 30 is automatically held by backstop brake 44 and since the brake 29 is loaded, shaft 10 will not rotate in a reverse direction to hoisting direction.

If at any time the brake torque should become less than that required to hold the load and slippage could occur, then again a relative movement of the traveling nut 17 towards input clutch 19 and brake assembly 29 occurs and overcomes the insufficient torque. The reverse locking brake 9 will not permit the nut 17 to rotate with the shaft 10 without axial displacement and thus assuring the brake loading action.

To lower the load, motor 1 will operate to move gears 4, 7, 8 and 18 in a direction opposite that for hoisting to cause nut 17 to travel away from the input clutch 19. This movement is limited by stop collar 15. Movement of nut 17 away from input clutch 17 will reduce the brake loading force and permit drum 11 to unwind at a speed determined by the speed of motor 1. Traveling nut 17 acts as a governor and will seek a balance position corresponding to torque equilibrium and load steady motion. If drum 11 picks up speed in excess of equilibrium condition, nut 17 will move towards input clutch 19 to increase brake torque and slow down the load. Should the drum speed lag below the balance speed, the braking torque will be decreased by nut 17 moving away from input clutch 19 and the load correspondingly increased to return to the balance condition.

When the hook, not shown, of the hoisting system is free of a load and its weight is not sufficient to overcome the drum drive mechanism friction torque to unwind the cable 13, the motor 1 will move nut 17 towards stop collar 15 where it will bear against it to increase axial force of shaft 10 to build up sufficient friction torque through the thread to rotate drum 11 and lower the hook.

The modification illustrated in FIG. 2 discloses a winch drive mechanism which has an automatic brake unit and a direct drive from the input motor to the drive shaft of the winch drum through a traveling nut and a dog-type clutch arrangement. In this form, only the brake is of the disc type, the traveling nut applying the brake through a spring.

A fluid motor is indicate by 45 and has a drive shaft 46 journaled in bearings 47. An elongated gear 48 is carried by the free end of shaft 46.

A drive shaft 49 having an axis parallel and spaced from armature shaft 46 is journaled in bearings 50, 51 and 52 as shown. A reduction gear box 53 and a winch drum 54 and cable 55 complete the hoisting elements. A portion of drive shaft 49 is threaded as at 56 and a traveling nut 57 is threadably mounted thereon. Traveling nut 57 is cylindrical as shown and is provided with a peripheral gear 58 which meshes with gear 48. Traveling nut 57 is further provided with crown gears 59 and 60, one at each end thereof.

A crown gear 61 is fixed to shaft 49 and spaced axially from gear 59 and another crown gear 62 is fixed on shaft 49 and spaced axially from gear 60 as shown; gears 61 and 62 forming clutching elements.

A tubular housing 63 is mounted on shaft 49 and is adapted to slide and be driven by splines 64.

A disc brake assembly indicated generally by 69 is disposed about shaft 49, as shown, and consists of a tubular housing 70 which is provided with peripheral ratchet teeth 71. Housing 70 is rotatable independently of shaft 49 on bearings 72 mounted in a support 73. A pawl 74 carried by support 73 engages with teeth 71 and thus forms a backstop clutch to prevent rotation of housing 70 in a reverse direction.

The disc brake per se consists of a series of discs 75 carried by housing 70 and a series of discs 76 carried by bushing 64 are disposed between discs 75 as shown. A coil spring 77 encircles shaft 49 and biases between discs 76 and housing 63.

The operation of the modified form is as follows:

When motor 45 is activated to raise a load, it rotates shaft 46 and gear 48 which turns traveling nut 57 in a direction to mesh crown gears 59 and 61 to rotate shaft 49 to rotate drum 54, through reduction gearbox 53 and windup cable 55. As nut 57 travels towards crown gear 61, housing 63 which is carried by nut 57 moves housing 63 towards brake assembly 69 and compresses spring 77 which gradually applies friction on discs 75 and 76 to fully apply the brake 60. The housing 70 is permitted to rotate in the direction of hoist but no reverse movement of housing 70 is possible due to pawl 74 which rides in ratchet teeth 71. Thus, when drive motor 45 stops, the load 55 is fully supported by the brake 69.

Similarly when lowering, nut 57 progressively reduces the compression in spring 77 until the brake 69 slips and allows the load to descend. Any tendency for the load to overrun the motor caused the spring 77 to be compressed and additional braking to be applied.

Crown gears 60 and 62 do not normally mesh, since they prevent nut 57 from running off the end of shaft 49 and may serve to lower an empty load hook.

Should the lowering speed become excessive the nut 57 will be moved away from crown gear 62 and also move housing 63 to compress spring 77 and load brake discs 75 and 76 as before. Thus the lowering speed is controlled by the traveling nut 57 acting as a governor.

The thread pitch of nut 57 and the compression rate of spring 77 may be predetermined so that a specific load increase on cable 55 is applied to stop a descending load.

If desired, a reverse locking clutch, not shown, may be inserted between gear 48 and motor 45 to hold a load in event of a mechanical disconnect failure in the system.

While only preferred forms of the invention are shown and described, other forms of the invention are contemplated and numerous changes and modifications may be made therein without departing from the spirit of the invention as set forth in the appended claims.

We claim:

1. A mechanical load brake system comprising in combination, a drive shaft having a load hoisting drum carried by one end thereof, a stop collar fixed at its other end, there being an externally threaded portion on said drive shaft adjacent said stop collar, a screw nut mounted for axial travel on said threaded portion, a motor having a driven shaft, a first bevel gear carried by said motor shaft, an idler shaft having an axis normal to said motor shaft, a second bevel gear carried by one end of said idler shaft and being in mesh with said first bevel gear on said driven shaft, a spur gear carried by the other end of said idler shaft, a gear carried by said screw nut and being in mesh with said spur gear whereby said screw nut is rotated by said motor through said gearing to travel axially along said drive shaft, clutching means mounted on said drive shaft and adapted to be activated upon axial displacement of said screw nut to rotate said drive shaft and said drum, and a backstop brake coupled to said clutching means to prevent reverse rotation of said drive shaft and drum while hoisting a load.

2. A mechanical load brake system including a drive shaft having a load hoisting drum carried by one end thereof, a stop collar fixed at its other end, there being an externally threaded portion on said drive shaft adjacent said stop collar, a screw nut mounted for axial travel on said threaded portion, a motor having a driven shaft, a transmission between said driven shaft and said screw nut and an input member on said drive shaft energized by said screw nut; a clutching means for said system comprising, a cup-shaped housing rotatably mounted on said drive shaft, a first series of friction discs carried by the inner peripheral wall of said housing, a hub portion splined to said drive shaft for rotation therewith, a second series of friction discs carried by said hub portion and being disposed in alternate fashion between said first series of friction discs, a ball and ramp assembly disposed between said cup-shaped housing and said input member energized by said screw nut, a ring gear carried by said cup shaped housing and a backstop brake having A GEAR IN MESH WITH SAID RING GEAR, WHEREBY WHEN WEDGING ACTION PRODUCED IN SAID BALL AND RAMP ASSEMBLY BY SAID INPUT MEMBER SAID FIRST AND SECOND SERIES OF FRICTION DISCS ARE PRESSED TOGETHER TO ROTATE SAID CUP-shaped housing with said drive shaft and said backstop brake acting to permit said cup-shaped housing to rotate in one direction only while said drum is hoisting a load.